United States Patent [19]
Wagner

[11] 3,920,610
[45] Nov. 18, 1975

[54] METHOD OF MAKING AND TAILORING PROSTHETIC FEET

[76] Inventor: Eugene Wagner, c/o Wagner's Orthopedic Supply Co., 375 W. 4th South St., Salt Lake City, Utah 84110

[22] Filed: Apr. 24, 1974

[21] Appl. No.: 463,757

Related U.S. Application Data

[62] Division of Ser. No. 336,507, Feb. 28, 1973, Pat. No. 3,833,941.

[52] U.S. Cl. .............................. 264/46.9; 3/6.1; 3/7; 264/259; 264/275
[51] Int. Cl.² ........................................ B29D 27/04
[58] Field of Search .............. 264/45, 271, 275; 3/7, 3/6.1

[56] References Cited
UNITED STATES PATENTS

| | | | |
|---|---|---|---|
| 546,405 | 9/1895 | Marks | 3/7 |
| 2,036,830 | 4/1936 | Rowley | 3/6.1 |
| 2,289,154 | 7/1942 | Van Cise | 3/6.1 X |
| 2,556,525 | 6/1951 | Drennon | 3/6.1 X |
| 3,098,239 | 7/1963 | Nader | 3/7 |
| 3,335,428 | 8/1967 | Gajdos | 3/7 |
| 3,400,408 | 9/1968 | Garcia | 264/45 |
| 3,766,569 | 10/1973 | Orange | 3/7 |

*Primary Examiner*—Philip Anderson
*Attorney, Agent, or Firm*—George H. Mortimer

[57] ABSTRACT

A method of making prosthetic or artificial feet comprising forming a wooden keel for the ankle portion which has a diminished heel portion, a flat arch portion, a curved instep portion, a rounded lower front end portion and a flat top; securing a reinforcing member comprising a highly resilient synthetic resin (preferably nylon) strip at its rear end to said flat arch portion with its front end extending forwardly into a toe portion to be molded around it to give the toe predetermined flexibility; and molding a one piece soft resilient foot-forming foam coating under and around said keel and reinforcing member. The exposed broad surfaces of said strip may be coated to bond it to said foam coating.

The method of making such artificial feet may provide heel portions of predetermined variable density and toe portions of predetermined flexibility to tailor a foot to the characteristics of an amputee by fashioning the keel with its heel portion properly diminished for the predetermined heel density, preparing the reinforcing strip to provide the predetermined toe flexibility by choice of composition, gauge, length and number of highly resilient synthetic resin (preferably at least one nylon) strips, securing it properly to the keel and molding the soft synthetic resin foam under and around said keel and reinforcing member.

10 Claims, 5 Drawing Figures

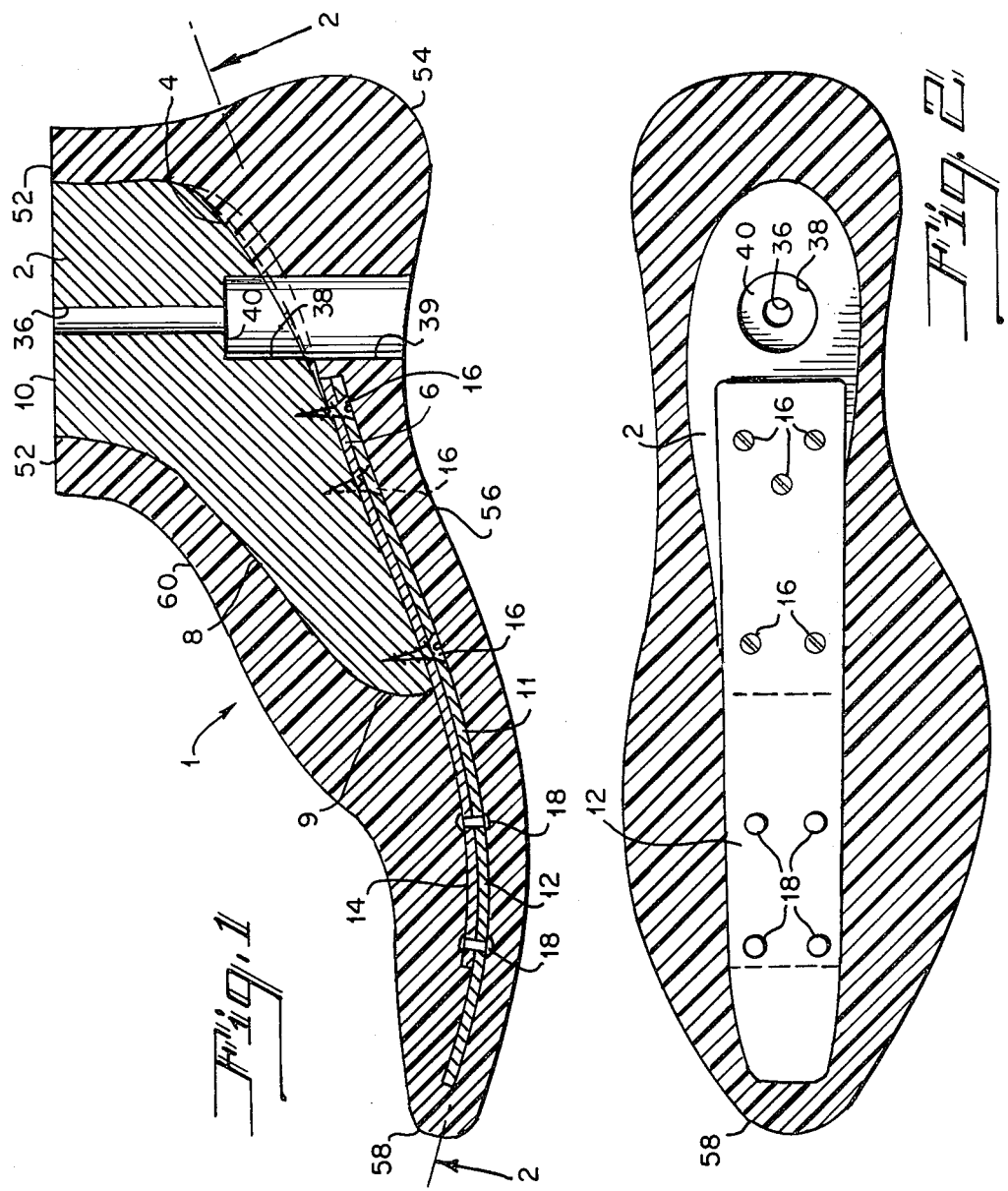

METHOD OF MAKING AND TAILORING PROSTHETIC FEET

INTRODUCTION

The present invention relates to a method of making prosthetic or artificial feet of the so-called SACH type, i.e., one having a solid ankle and cushion heel. This application is a division of my application Ser. No. 336,507, filed Feb. 28, 1973 now U.S. Pat. No. 3,833,941.

BACKGROUND OF THE INVENTION

Various types of artificial or prosthetic feet have been used for many years. Some of them had been complex devices with many parts joined together mechanically but in more recent years the most widely used artificial foot has comprised, (1) an inelastic keel or core made of wood without any ankle joint; (2) a molded polymer of rubber or foam plastic completely covering the core except where it contacts the leg portion of an artificial limb; and (3) either a flexible steel spring or a band of belting material secured to the undersurface of the core and extending forwardly of the front end thereof into the toe section of the molded portion of the foot. Examples of artificial feet of this type are disclosed in the Nader U.S. Pat. No. 3,098,239, granted July 23, 1963 and Orange U.S. Pat. No. 3,484,871, granted Dec. 23, 1969.

Artificial feet made in accordance with the Nader patent, as noted in the Orange patent, had been found to be too flexible and without sufficient elasticity. Such feet depend for flexibility and elasticity on the qualities of the polyurethane foam which develops fatigue after it has been walked on for a few weeks or months. This results in loss of balance in the alignment which is given when the artificial leg was first fitted. The amputee ends up with a toe section that tends to curl up, to become more and more flexible with use and, in some cases, the feet break.

Feet made as proposed in the Orange patent are much more expensive and difficult to manufacture than the Nader feet because of the numerous parts which have to be assembled, the poor bonds between the various layers or lamina in the reinforcing member 21–34, the reliance on polyurethane foam for resilience, and the problems of separation of the different elements made of polyurethane foam from one another and from other elements to which adherence is necessary, all of which tend to make performance unsatisfactory.

It has also been proposed to provide reinforcement for the toe portion of an artifical foot by means of a plurality of lamina of impregnated cords in a sort of triangle, somewhat as illustrated in Andrews U.S. Pat. No. 616,873, granted Jan. 3, 1899. This type of artificial foot also operates satisfactorily only as long as the foam or rubber does not fatigue.

SUMMARY OF THE INVENTION

The present invention overcomes the disadvantages of the artifical feet of the prior art by forming a hardwood core or keel having a resilient member comprising at least one strip of highly resilient synthetic resin, preferably nylon, secured thereto and extending into the toe portion of a cast soft resilient foam covering, preferably polyurethane, so as to provide the flexibility and resiliency of the toe portion largely from the resilient member. In other words, the toe flexibility of feet made in accordance with this invention do not rely upon the resilience of a molded foam covering around the core but primarily upon the resilient member.

This method makes it practicable to provide feet having a wide range of toe flexibilities so that the amputee can select a foot which is just right for his weight and other characteristics. The foot can also be readily provided with a heel density which is firm, regular or soft. The heel density is thus built-in during molding so that the foot-forming coating is a one piece molded unit which has untouched skin even in the heel area. A foot formed in this manner is a compact unit with no separation of parts and it can be provided in any desired color since the chemicals are clear and any color can be reproduced. The finished foot can be sanded without melting, if necessary, although in general it is not necessary. It is comparatively light in weight, being between 40 to 80 grams lighter than feet of the prior art and it has consistent flexibility throughout life with no curling up and breaking of the toe portion.

BRIEF DESCRIPTION OF THE DRAWING

FIG. 1 is a vertical sectional view through a preferred artificial foot made in accordance with the present invention;

FIG. 2 is a sectional view looking upwardly from a horizontal plane along the line 2—2 of FIG. 1;

DETAILED DESCRIPTION OF THE INVENTION

Figure 3:
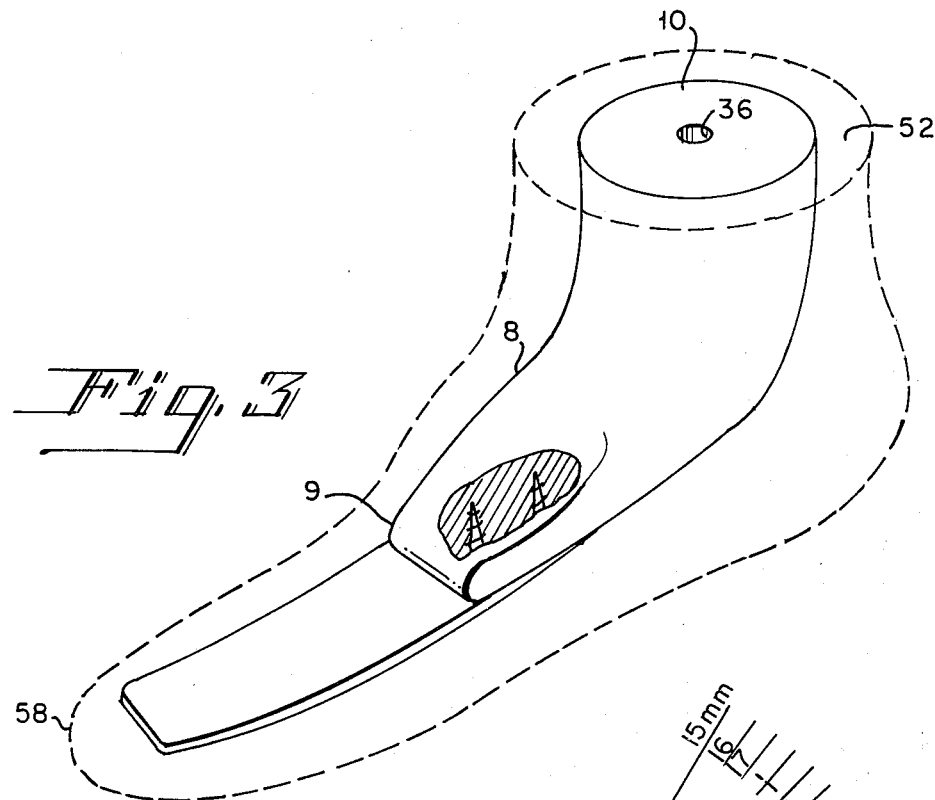
FIG. 3 is a perspective view of a core or keel and attached resilient strip showing in dotted lines the space to be filled with polyurethane foam to complete the manufacture of the artificial foot.

The artificial or prosthetic foot made by the method of the invention, as illustrated in FIGS. 1 and 2, is referred to generally by reference character 1. It comprises a keel 2, advantageously formed of hardwood, comprising a heel portion 4 which may be diminished in varying degrees as indicated by the dotted lines for a purpose later to be described, a flat arch portion 6, a curved instep portion 8 and a rounded front end portion 9. The keel preferably has a flat top portion 10 to engage the lower end of the artificial leg with which this foot is designed to be used, as described in greater detail hereinafter.

A reinforcing member referred to generally by reference numeral 11 is provided for the purpose of giving controlled flexibility to the toe portion of the finished foot, as will be described in detail hereinafter. As illustrated in FIG. 1 the reinforcing member 11 comprises a lower strip 12 and an upper strip 14 fastened at the rear end to the flat arch portion 6 of the keel 2, e.g. by means of wood screws 16, so that the front end of said member 11 extends almost to the end of the toe portionn of the finished foot.

While it is preferred to use a reinforcing member comprising a plurality of strips, e.g., two, as shown in FIG. 1, the member may comprise a single nylon strip which would have the length of strip 12, as shown in FIG. 3. In those cases where more than one strip is used, they should be fastened together, e.g., by an adhesive bond or by mechanical fastening means such as rivets 18.

Figure 4:
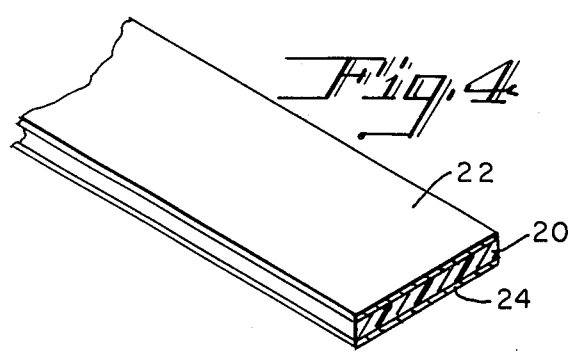
FIG. 4 is a perspective view of a piece of oriented nylon belting with the near end in section in which the core is a strip of nylon.
Figure 5:
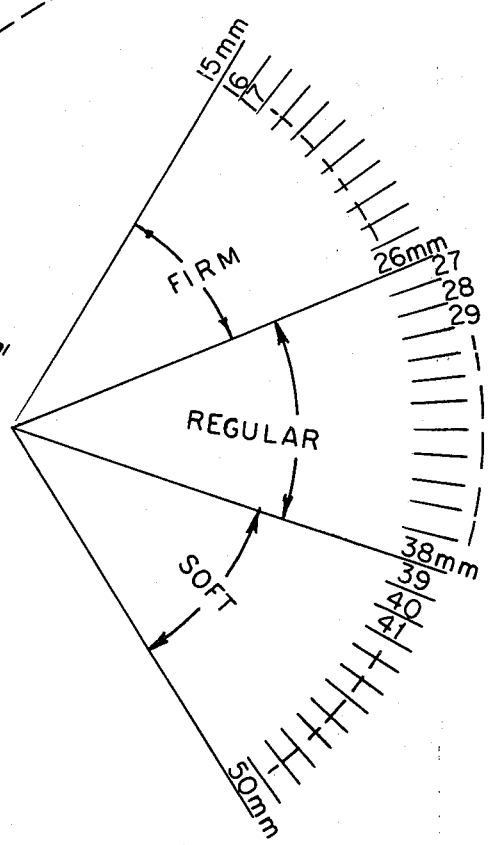
FIG. 5 is a chart of toe flexibilities obtainable in accordance with the present invention and which can be used to tailor a foot to the characteristics of an amputee.

Referring now to FIG. 4, the strip or strips used in providing the reinforcing member 11 comprises a continuous band, strip or ribbon 20 of highly resilient synthetic resin, preferably oriented nylon which is polyamide resin well known to those skilled in the art, but other synthetic resins having comparable properties, e.g., polyolefins such as polypropylene, may also be used, if desired. By varying the gauge and composition of the strip or strips, varying degrees of resilience of the reinforcing member are easily provided. In general the gauge of the strip is selected within the range of about 3 to 6 mm. thickness.

Nylon and some other synthetic resins of high resilience do not form a good bond with resins that form soft resilient foams such as polyurethane resin foam which is the material preferably used for molding the foot around the unit comprising the keel and reinforcing member. Accordingly it is desirable and preferable to provide a surface covering on one or both sides of the nylon or like strip, depending upon whether both surfaces are to be exposed to the polyurethane resin in the molding step. It is not necessary, for example, to have a surface coating on the contacting surfaces of nylon strips 12 and 14 when the two strips are secured together as shown in FIG. 1 but wherever a nylon or like strip is exposed to, and should bond with, the polyurethane or like foam resin it is preferable to provide a surface coating on all broad surfaces that come in contact with the foam resin. This coating is to have the characteristic of bonding thoroughly to nylon or like plastic and also bonding thoroughly to polyurethane or like foam resin or other material used to fashion the foot around the keel and associated parts. The surface coating 22, for example, may comprise a mixture of rubber and plastic intimately bonded by welding to a nylon strip 20, or a mixture of rubber latex and carbon black or tar which is coated on and bonded to the nylon strip, and, if desired, the coating may also have incorporated therein any of various fabrics which can be secured by suitable bonding means to the nylon and to the polyurethane resin when it is molded around the unit comprising the keel and associated parts. The covering 24 on the other broad surface may be made of the same materials as the surface covering 22 or from different materials provided they have the same general characteristics described above.

In order to enable an amputee to fasten the artificial foot to the bottom of the artifical leg, the keel may be provided with a bolt hole 36 extending from the flat top surface 10 downwardly through the keel and with a bolt headhole 38 at the lower end thereof. In order to provide access to the headhole 38 in the finished foot an extension 39 of the hole 38 may be provided in the soft resilient coating as seen in FIG. 1. This is easily accomplished by placing a plug in 38 during the molding operation which is pulled out when the foam plastic has cured and the foot is removed from the mold as described hereinafter. At the bottom of the headhold 38, as viewed from below, as in FIG. 2, is a shoulder 40 against which the head of the bolt, a washer or the like, may bear so as to give a good secure fastening of the foot 1 to the leg (not shown).

After the keel and reinforcing member have been assembled into a unit as described, the unit may be placed in a mold having the desired contour for the finished foot and suitably held in place away from the interior surfaces of the mold a proper distance so as to provide a covering of soft resilient foam of the desired thickness at every point under and around the keel and reinforcing strip. The finished foam covering has a top wall 52 in the plane of the flat top 10 of the keel 2, as clearly seen in FIG. 1. The finished foot comprises a heel portion 54, an arch portion 56, a flexible toe portion 58 and an instep 60. As noted, the instep 60 is curved and follows generally the contour of the curved instep portion 8 of the keel. The thickness of the foam covering on the sides of the keel which are not shown in FIG. 1 is comparable to that shown at the instep portion between the keel 8 and the outside instep surface 60, as indicated in FIG. 3.

While any desirable method of covering the keel unit with soft resilient foam may be used, the preferred method comprises providing a mold comprising a flat bottom wall to which the flat top 10 of keel 2 can be secured, e.g., by bolt passing through hole 36 which is screwed into a tapped hold in the flat bottom wall. Upwardly extending walls rising from this bottom wall form an open top mold cavity conforming to the finished shape of the visible portions of the foot when it rests on its sole on a flat surface. An operator fills the cavity between the keel unit and the walls of the mold cavity through the open top of the mold with a suitably prepared plastic composition to form the soft resilient foam covering. After the mold cavity has thus been filled, a cover is applied to close the open top and its inner surface is contoured to form the sole of the foot. As those skilled in the art know, the foaming process develops considerable pressure and requires venting of air as the plastic swells. To withstand the pressure and keep the mold cavity tight after venting, the covered mold is preferably placed in a press that resists the pressure generated in the foaming reaction which lasts several minutes, e.g., about 15 to 20 minutes, after which the cover may be removed and the foot withdrawn from the mold.

The heel density, while primarily controlled by the contour of the heel portion of the keel as later described, may also be controlled to a desirable degree by the tightness of the packing of the resin composition in the vicinity of the heel in the open mold. For a soft heel the packing is light but for a very firm heel the packing is tight or heavy, with all possible variations between these extremes.

Polyurethane resin is a particularly desirable material for use in forming the foam coating around the keel unit in the present invention but any other resin having similar or equivalent properties may be substituted, if desired, e.g., rubber, synthetic resins, and the like.

The SACH type foot requires various degrees of flexibility in the toes and density in the heel in order to provide different amputees with a satisfactory fit because of their different height, weight and other characteristics. The present invention is admirably adapted to the fitting or tailoring of a prosthetic foot to meet the varying needs of different amputees.

The heel density can be varied by the simple expedient of changing the contour of the diminished heel portion 4 as shown in FIG. 1. By diminishing the heel portion of the keel to the solid line 4, the heel of the foot will have a soft density because of the larger amount of yieldable foam resin between the outer surface of the heel 54 and the surface of the heel portion 4 of keel. On the other hand if the heel portion 4 of the keel is diminished to the outer dotted line, the density of the heel of the foot will be more firm. By diminishing the heel portion of the keel to an intermediate position, the density of the heel of the foot is predetermined between those extremes and may be termed regular.

A similar tailoring of the flexibility of the toe is achieved by one or a combination of variations in the reinforcing member 11. One way of changing the resiliency and flexibility of member 11 is by changing the gauge of a single nylon strip, e.g., a 3 mm. strip would give a soft toe, a 6 mm strip a firmer toe and a 4 mm. strip an intermediate or regular toe. Generally speaking it is preferable not to rely solely on the gauge of a single strip for firm toes but rather to supplement the long strip of the reinforcing member with an additional strip of somewhat shorter length, as shown in FIG. 1. By properly selecting the number of strips, the composition and the gauge thereof it is possible to provide flexibility in the toe within the entire range of 15–50 mm. as indicated in FIG. 7. The numerical values of toe flexibility are obtained in a toe flexibility test on a complete foot made in accordance with the present invention which is carried out by mounting the foot upside down with the plane tangent to the sole lying at an angle of 31° to the horizontal and with the toe higher than the heel. A vertical downward force of 45 kg (about 100 pounds) is then applied to the toe portion over an area across and for some 5–10 cm. back from the tip of the toe to cause the toe to be deflected downwardly. A scale calibrated to mm. stands vertically at the side of the foot with a pointer attached to the tip of the toe at 0 in unloaded condition. After loading, the position to which the pointer has been deflected downwardly on the scale is read. It has been discovered that, under the conditions of this test, firm toes suitable for use according to this invention give scale readings of deflection or index numbers that may vary from about 15 to 26 mm., regular or medium toes from about 27 to 38 mm. and soft toes from about 39 to 50 mm. With the same composition gauge and proportions of the strip or strips in the reinforcing member the toe flexibility index number varies with shoe size. The following table gives the range of index numbers a particular example of construction for a medium toe with shoe size:

TABLE OF TOE FLEXIBILITY

| Shoe Size | Index Number |
| --- | --- |
| 6 | 28 |
| 7 | 29 |
| 8 | 30 |
| 9 | 31 |
| 10 | 32 |
| 11 | 33 |
| 12 | 34 |
| 13 | 35 |

Each degree of flexibility from very soft at 50 mm. to very firm at 15 mm. can easily be obtained by proper selection of the number, composition and gauge of the strip or strips used to form the reinforcing member.

The present invention is thus a major step forward in the artificial foot art because it enables the operator in a limb shop to order feet not only by the density in the heel, either firm, medium or soft, but also to order feet by the toe flexibility index numbers at any level within the range of 15–50 mm. This is important because, for example, a young man with a below the knee (BK) prosthesis needs a more firm toe than a young man whose leg has been amputated above the knee (AK) who requires a softer toe. This can be taken into consideration, for example, by subtracting 1–3 index numbers for a BK amputee and adding 1–3 index numbers for an AK amputee when ordering a foot in accordance with the invention. Geriatric, weak or lightweight people also need and prefer rather soft feet in the toe area while strong walkers, heavyweight people and the like need more firm toes and higher density heels. These factors can also be taken into consideration in ordering feet in accordance with this invention by subtracting one index number for very active or heavy people and adding one index number for inactive or light weight people or geriatrics. For the foot manufacture it requires only routine determination of the index numbers of feet of different sizes made using varying compositions, numbers of strips and gauges thereof to obtain reproduceable specifications for feet having each degree of toe flexibility from 15–50 mm. so that when an order is received from a limb shop for a foot of given size having a designated toe flexibility it is necessary only to refer to the specifications to determine what reinforcing member needs to be provided to produce that flexibility in the finished foot. In the present invention, moreover, the flexibility of the toe is determined almost entirely by the characteristics of the reinforcing member and not by the properties of the polyurethane or other foam covering.

There is a readily available commercial source for reinforcing strips which are admirably adapted for use in the present invention. This is from the field of transmission belts which are available in varying widths, gauges and compositions. The main strip 12, which is used alone or in combination with a strip 14, should in all cases be nylon or a plastic having equivalent high resiliency. A transmission belt that is particularly satisfactory is manufactured by Habasit Company of Switzerland in varying gauges of oriented nylon from 3 to 6 mm. with coatings tightly adhering to each broad surface that form good bonds with polyurethane foam resins. The invention is not limited, however, to Habasit belting since equivalent nylon or other plastic strips may be used instead, and, for the preferred process, provided they have coatings on both broad surfaces thereof which not only adhere tightly to the nylon core but also form a permanent bond with polyurethane resin under the molding conditions used in making the feet in accordance with the present invention. In cases where the desired toe flexibility can be obtained most satisfactorily by use of a second strip 14 instead of relying for control on gauge alone, the second strip also is preferably coated nylon of the same width as the first of main strip but its gauge may be different, if desired. Moreover, second strips made of a different composition may be used with a first strip of coated nylon if desired. Thus a foot made by use of a reinforcing member comprising a coated nylon first strip of 4 mm. gauge and a shorter strip of rubber impregnated fabric belting of about the same gauge is commercially acceptable and somewhat less expensive than a more satisfactory foot made with two nylon strips.

Although the invention has been described and illustrated in connection with certain procedures and selection of particular materials of construction, it will be understood that variations and modifications may be made without departing from the spirit of the invention.

Having thus described and illustrated the invention, what is claimed is:

1. The method of making a prosthetic foot comprising forming a keel having a diminished heel portion, a substantially flat arch portion, a curved instep portion and a rounded lower front end portion, fastening to said flat arch portion the rear end of a reinforcing member comprising a strip of highly resilient synthetic resin the front end of which extends almost to the end of the toe to be formed around it, and molding a soft resilient foam coating comprising toe portion, instep, ankle, heel and arch under and around said keel and reinforcing member.

2. The method of making a prosthetic foot as set forth in claim 1 in which said reinforcing member is coated prior to the molding operation with an adherent material that bonds in the molding operation to the foam coating material in contact therewith.

3. The method of making a prosthetic foot as set forth in claim 1 in which the flexibility of said toe portion as determined by the herein described toe flexibility test is controlled by the gauge and structure of the reinforcing member within the limits of 15 mm. to 50 mm.

4. The method of making a prosthetic foot as set forth in claim 1 in which said reinforcing member comprises a strip of nylon of predetermined flexibility.

5. The method of making a prosthetic foot as set forth in claim 4 in which said reinforcing member includes a shorter upper supplemental strip secured to said flat arch portion and to the longer nylon strip.

6. The method of making a prosthetic foot as set forth in claim 4 in which said strip of nylon is cut from coated oriented belting.

7. The method of making a prosthetic foot as set forth in claim 6 in which the reinforcing member includes a shorter upper supplemental strip of coated oriented belting secured to the flat arch portion and to the longer nylon strip.

8. The method of tailoring a prosthetic foot to the characteristics of an amputee comprising determining the toe flexibility and heel density required properly to conform to said characteristics, fashioning a keel with a substantially flat arch and a diminished heel to conform to said required heel density, preparing a reinforcing member of suitable length having at least one nylon strip to provide said required toe flexibility, securing the rear end of said member to the flat arch of said keel, and molding a soft resilient foam covering of polyurethane resin under and around said keel and member to form a foot comprising a toe portion of predetermined flexibility, an instep, an ankle, a heel of predetermined density and an arch.

9. The method as set forth in claim 8 in which said nylon strip is coated prior to the molding operation with an adherent material that bonds in the molding operation to the foam covering material in contact therewith.

10. The method as set forth in claim 8 in which the molding of said polyurethane is carried out by fashioning said keel with a flat top portion; firmly mounting said keel upside down in a mold comprising a flat bottom, an open top and upwardly extending walls conforming to the finished shape of the visible portions of the foot when it rests on the sole; preparing a formable polyurethane resin composition to form the soft resilient foam covering; introducing the prepared composition through said open top into the space around said keel and reinforcing strip; placing a cover over said open top to close the mold and resist the pressure generated; maintaining the mold closed until the foaming reaction is completed; and removing the foot from the mold.

* * * * *